2 Sheets—Sheet 1.

G. H. EVERSON.
Hydraulic Engine.

No. 197,926. Patented Dec. 11, 1877.

Witnesses
B. L. Johnston
L. P. Rider.

Inventor
George H. Everson
By A. C. Johnston
Atty

2 Sheets—Sheet 2.

G. H. EVERSON.
Hydraulic Engine.

No. 197,926. Patented Dec. 11, 1877.

Witnesses
B. L. Johnston
L. P. Rider

Inventor
George H. Everson
By A. C. Johnston
Atty

N. PETERS, PHOTO-LITHOGRAPHER, WASHINGTON, D. C.

UNITED STATES PATENT OFFICE.

GEORGE H. EVERSON, OF SCOTTDALE, PENNSYLVANIA.

IMPROVEMENT IN HYDRAULIC ENGINES.

Specification forming part of Letters Patent No. 197,926, dated December 11, 1877; application filed October 1, 1877.

*To all whom it may concern:*

Be it known that I, GEORGE H. EVERSON, of Scottdale, in the county of Westmoreland and State of Pennsylvania, have invented a new and useful Improvement in Hydraulic Engines; and I do hereby declare that the following is a full and exact description thereof, reference being had to the accompanying drawings, and to the letters of reference marked thereon.

My invention relates to an improvement in hydraulic engines; and consists, first, in constructing the wheel-cylinder, fore-bay, and discharge-sluice in one piece; second, in the combination of diaphragms with the water-wheels; and, third, in placing the step within a recess surrounding the lower end of the shaft.

To enable others skilled in the art to make and use my invention, I will proceed to describe its construction and operation.

Figure 1:
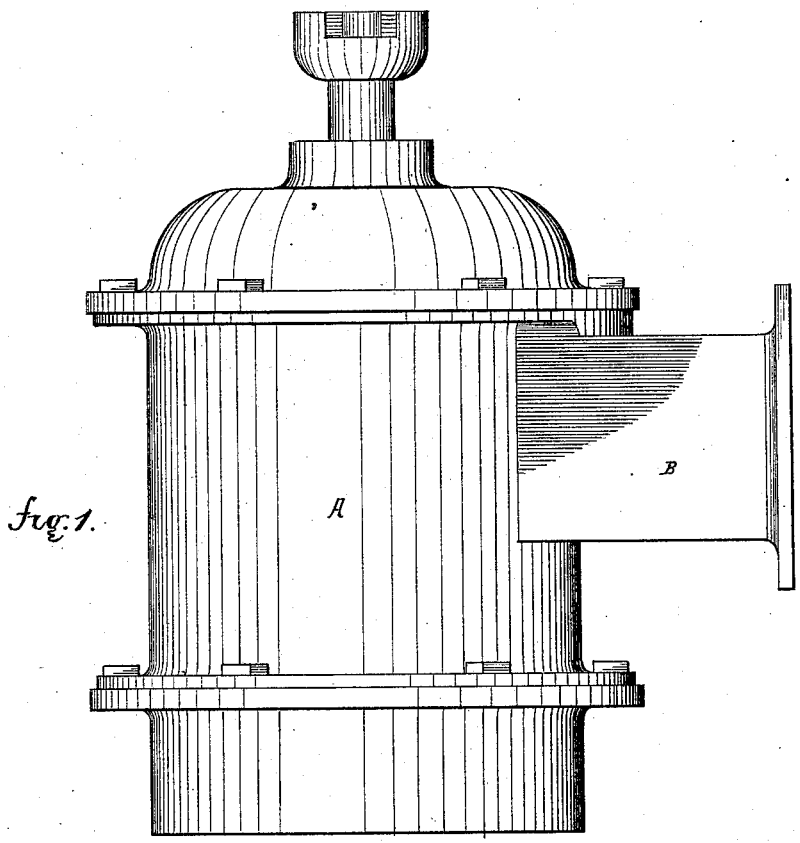
Figure 2:
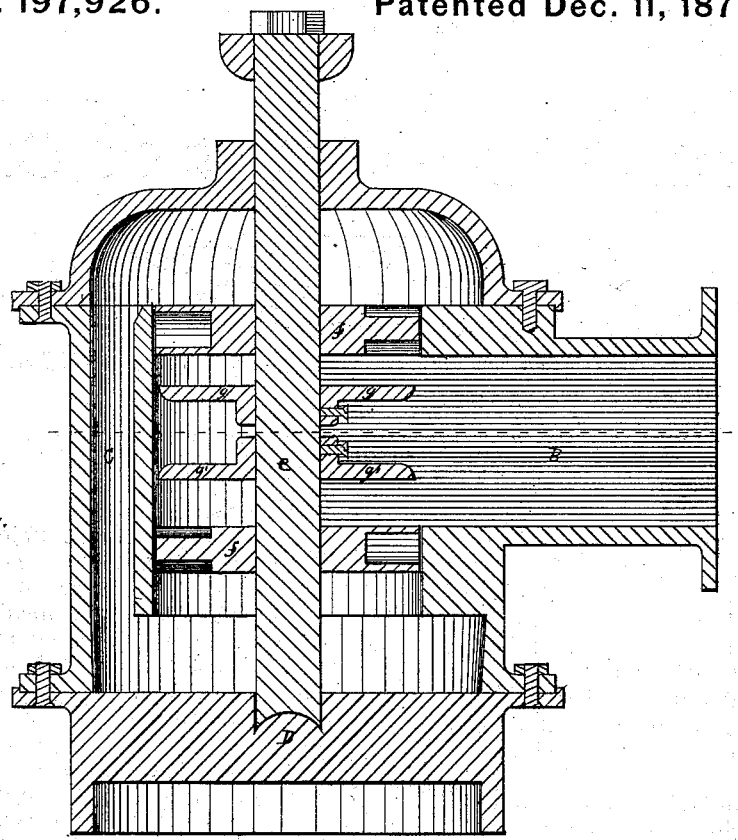
Figure 3:
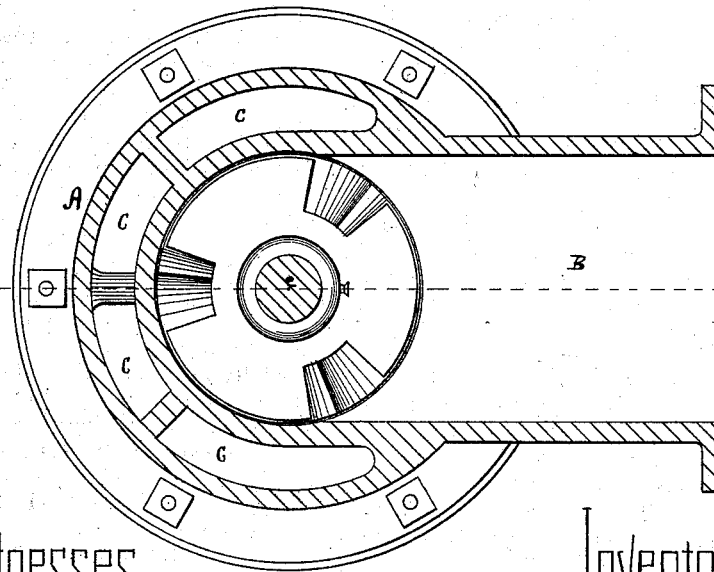

In the accompanying drawings, which form part of my specification, Figure 1 is a side elevation of my improvement. Fig. 2 is a vertical section of the same. Fig. 3 is a transverse section at line $y$ of Fig. 1.

In the drawings, A represents the cylinder for the wheels; B, the fore-bay; C, the discharge-sluices; D, the step for the bearing of the shaft $e$, upon which are arranged the wheels $f$ and diaphragms $g\ g'$, as shown in Fig. 2.

By this arrangement of the step in the recess, as shown in Fig. 2, the shaft is prevented from being displaced from its bearings. The diaphragms are adjusted on the shaft $e$, and are used for the purpose of diminishing the power of the wheels $f$, which is effected by placing the diaphragms in closer proximity to the wheels $f$. The lower diaphragm $g'$ is provided with a series of openings for the inlet of water to the wheel below it. The water may be closed entirely off the upper wheel by the diaphragm $g$, and the lower wheel supplied with a limited quantity of water, which will correspond to the size and number of openings in the lower diaphragms $g'$.

The operation of my improvement and its advantages will be apparent to those skilled in the art of constructing and using hydraulic engines.

Having thus described the nature, construction, and operation of my improvement, what I claim as of my invention is—

1. In a hydraulic engine, the wheel-cylinder A, fore-bay B, and discharge-sluices C around the wheels and diaphragms, constructed in one piece, and arranged substantially as herein described and shown, and for the purpose set forth.

2. The combination of the diaphragms $g\ g'$ with the wheels $f$, substantially as herein described, and for the purpose set forth.

3. The step D, formed within a recess, substantially as shown, the said recess extending only part way through the bottom of the case, so that the step D shall constitute the bottom of the recess, and receive shaft $e$, as herein described, and for the purpose set forth.

GEORGE H. EVERSON.

Witnesses:
A. C. JOHNSTON,
WM. BYRNES.